US011797768B2

(12) United States Patent
Topol

(10) Patent No.: US 11,797,768 B2
(45) Date of Patent: Oct. 24, 2023

(54) SYSTEM AND METHOD TO REPRESENT CONVERSATIONAL FLOWS AS GRAPH EMBEDDINGS AND TO CONDUCT CLASSIFICATION AND CLUSTERING BASED ON SUCH EMBEDDINGS

(71) Applicant: MuyVentive, LLC, West Hartford, CT (US)

(72) Inventor: Zvi Topol, West Hartford, CT (US)

(73) Assignee: MuyVentive, LLC, West Hartford, CT (US)

( * ) Notice: Subject to any disclaimer, the term of this patent is extended or adjusted under 35 U.S.C. 154(b) by 0 days.

(21) Appl. No.: 17/662,907

(22) Filed: May 11, 2022

(65) Prior Publication Data

US 2022/0269859 A1   Aug. 25, 2022

Related U.S. Application Data

(63) Continuation-in-part of application No. 16/697,940, filed on Nov. 27, 2019, now Pat. No. 11,361,163.

(60) Provisional application No. 62/780,789, filed on Dec. 17, 2018.

(51) Int. Cl.
*G06F 40/279* (2020.01)
*G06F 16/33* (2019.01)
*G06F 16/35* (2019.01)

(52) U.S. Cl.
CPC ........ *G06F 40/279* (2020.01); *G06F 16/3344* (2019.01); *G06F 16/353* (2019.01)

(58) Field of Classification Search
CPC ... G06F 40/279; G06F 16/353; G06F 16/3344
See application file for complete search history.

(56) References Cited

U.S. PATENT DOCUMENTS 6,404,438 B1    6/2002  Hatlelid
9,984,428 B2 *  5/2018  Doyle ................... G06F 40/205
(Continued)

OTHER PUBLICATIONS

Topol, Gain Insight from Conversations Using Process Mining with LUIS, Cognitive Services, vol. 33, No. 12, 12 pp. Dec. 2018.
(Continued)

*Primary Examiner* — Seth A Silverman
(74) *Attorney, Agent, or Firm* — Cozen O'Connor

(57) ABSTRACT

Systems and methods develop a natural language interface. Conversational data including user utterances is received for a plurality of conversations from a natural language interface. Each of the conversations is classified to determine intents for each user utterance, and for each of the conversations, a control flow diagram showing the intents and sequential flow of the conversation is generated. Each of the control flow diagrams is processed to generate a graph embedding representative of the conversation. A previous conversation that is similar to the current conversation is identified from a previous graph embedding that is nearest to a current graph embedding of a most recent utterance in a current conversation. A previous outcome of the previous conversation is used to predict an outcome of the current conversation, which, when not positive, may control response outputs of the natural language interface to steer the current conversation towards a positive result.

10 Claims, 13 Drawing Sheets

(56) References Cited

U.S. PATENT DOCUMENTS

| | | | |
|---|---|---|---|
| 2013/0031100 A1* | 1/2013 | Graham | H04L 51/52 707/769 |
| 2014/0200891 A1* | 7/2014 | Larcheveque | G10L 15/1815 704/243 |
| 2014/0280224 A1* | 9/2014 | Feinberg | G06F 16/9024 707/748 |
| 2015/0294595 A1* | 10/2015 | Hu | G06Q 10/101 434/236 |
| 2016/0260112 A1* | 9/2016 | Irving | G06Q 10/0637 |
| 2017/0180284 A1* | 6/2017 | Smullen | H04L 69/14 |
| 2018/0032874 A1 | 2/2018 | Sanchez | |
| 2018/0129408 A1 | 5/2018 | Aradilla | |
| 2018/0366114 A1 | 12/2018 | Anbazhagan | |
| 2019/0057143 A1 | 2/2019 | Porter | |
| 2019/0228107 A1 | 7/2019 | Trim | |
| 2020/0234700 A1 | 7/2020 | Heltewig | |

OTHER PUBLICATIONS

Topol, Improving LUIS Intent Classifications, Cognitive Services, vol. 33, No. 7, 13 pp, Jul. 2018.

Narayanan et al., Graph2vec: Learning Distributed Representations of Graphs, arXiv:1707.05005v1 [cs.AI] Jul. 17, 2017, 8 pp.

Godec, Graph Embeddings—The Summary, Towards Data Science, 10 pp. Dec. 31, 2018.

Bose et al., Trace Alignment in Process Mining: Opportunities for Process Diagnostics, BPM 2010, LNCS 6336, pp. 227-242, Sep. 2010.

Tibshirani et al., Estimating the Number of Clusters in a Data Set Via the Gap Statistic, J.R. Statist., Soc. B, 2001, 63, Part 2, pp. 411-423.

Samarati et al., Protecting Privacy When Disclosing Information: κ-Anonymity and Its Enforcement Through Generalization and Suppression, 19 pages.

* cited by examiner

200

| TIMESTAMP | CONV ID | UTTERANCE |
|---|---|---|
| 2019-11-01 11:03:23 | 11 | Hi, I was interested to to get a quote for a car insurance policy |
| 2019-11-01 11:03:24 | 11 | No, I am not an existing customer |
| 2019-11-01 11:03:27 | 11 | I live in Los Angeles, California |
| 2019-11-01 11:03:30 | 11 | Yes, I would be interested in a collision coverage |
| 2019-11-01 11:03:32 | 11 | Please send me the quote to A@A.com |
| 2019-11-01 11:03:35 | 11 | Thank you very much, good bye! |

| TIMESTAMP | CONV ID | UTTERANCE | INTENT |
|---|---|---|---|
| 2019-11-01 11:03:23 | 11 | Hi, I was interested to to get a quote for a car insurance policy | ExplorationIntent |
| 2019-11-01 11:03:24 | 11 | No, I am not an existing customer | AccountIntormIntent |
| 2019-11-01 11:03:27 | 11 | I live in Los Angeles, California | LocationInformIntent |
| 2019-11-01 11:03:30 | 11 | Yes, I would be interested in a collision coverage | CoverageInfoIntent |
| 2019-11-01 11:03:32 | 11 | Please send me the quote to A@A.com | ContactInfoIntent |
| 2019-11-01 11:03:35 | 11 | Thank you very much, good bye! | EndConversationIntent |

*FIG. 4*

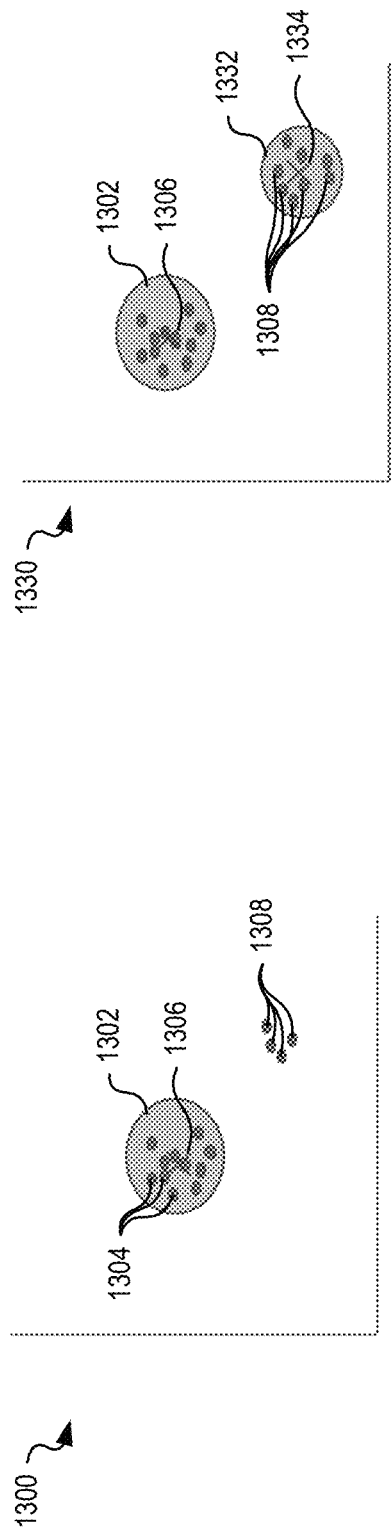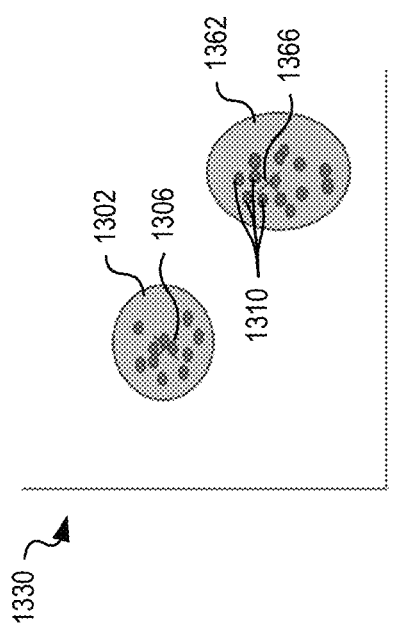
FIG. 13A
FIG. 13B
FIG. 13C

SYSTEM AND METHOD TO REPRESENT CONVERSATIONAL FLOWS AS GRAPH EMBEDDINGS AND TO CONDUCT CLASSIFICATION AND CLUSTERING BASED ON SUCH EMBEDDINGS

RELATED APPLICATIONS

This application is a Continuation-in-Part of U.S. patent application Ser. No. 16/697,940, titles "System and Method to Represent Conversational Flows as Graph Embeddings and to Conduct Classification and Clustering Based on Such Embeddings," filed Nov. 27, 2019, which claims priority to U.S. Patent Application Ser. No. 62/780,789, titled "System and Method to Represent and Classify Conversational Flows Using Process Mining", filed Dec. 17, 2018, and incorporated herein by reference.

BACKGROUND

Conversational data is generated by interacting with natural language interfaces such as voice interfaces and chatbots. A designer of the natural language interface cannot easily determine how well a natural language interface will handle a conversation.

Users of the natural language interfaces have meta data that characterize them, such as their location, age, gender, etc. Further, the natural language interface may collect other conversational meta data, such as an outcome variable for the conversation that characterizes and/or describes the conversation in some way. For example, the outcome variable may be one of: a categorial variable that describes whether the conversation was successful or not, based on some metric; a numerical variable indicative of a length of the conversation, such as a number of times the user interacted with the natural language interface; and an ordinal variable indicative of the user's indicated satisfaction ranking of the conversation based on rating in the range of one-unsatisfied to five-very satisfied.

SUMMARY

One aspect of the present embodiments includes the realization that there is a nascent but growing space called conversational analytics with a need for tools that facilitate development of natural language interfaces. The present embodiments solve this problem by providing a conversational analytics toolset that generates reports of summary statistics of popular intents and entities appearing in conversational transcripts and control flow diagrams that are generates to describe the conversations in a graphical representation. Advantageously, the conversational analytics toolset processes conversational data and generates summary statistics reports and graphical representations that allow the developer to see problems with the intents used by the natural language interface and learn how to adjust the intents to improve the quality of the natural language interface.

Another aspect of the present embodiments includes the realization that a natural language interface could steer a current conversation towards a positive outcome if it knew that the current conversation was likely to have a negative outcome. The present embodiments solve this problem by using graph embedding to identify a previous conversation that is similar to the current conversation and then determining whether that previous conversation had a negative outcome. When the previous conversation had a negative outcome, the natural language interface may be controlled to steer the current conversation towards a more positive outcome.

Another aspect of the present embodiments includes the realization that when sharing conversational datasets (potentially for research and development analysis purposes with other practitioners or researchers or to the public—for transparency purposes when possible) there are a few challenges that can arise: privacy and anonymization—textual content of conversations typically includes personally identifying information (PII), which is sensitive private information that a person or small group of people may not wish to disclose, including information that may lead to the person or group of people being identifiable, information about a nature of the conversation, and other sensitive information about the person or group. Advantageously, the embodiments described herein solve this problem by grouping such conversations and ensuring k-anonymity.

Another aspect of the present embodiments includes the realization that there is increasing regulatory requirements for privacy and personal information disclosure. Existing regulations include the General Data Protection Regulation (GDPR), which is a European regulation implemented in 2018 to enhance EU citizens' control over the personal data that companies can legally hold, Health Insurance Portability and Accountability Act (HIPPA) Privacy Rule implemented on Apr. 14, 2003, and the California Consumer Privacy Act (CCPA) that was adopted in 2018. These regulations also apply to personal information disclosed in conversational datasets, and therefore supporting privacy and protecting against personal information disclosure in conversations is critical in complying to these regulations.

In one embodiment, a method develops natural language interface. Conversational data including user utterances is received for a plurality of conversations from a natural language interface. Each of the conversations is classified to determine one or more intents for each of the user utterances, and, for each of the conversations, a control flow diagram showing the intents and sequential flow of the conversation is generated. Each of the control flow diagrams is processed to generate a graph embedding representative of the conversation.

In another embodiment, a method directs a current conversation with a natural language interface. A most recent utterance from a user in the current conversation is received and classified to determine an intent of the user. A current control flow diagram of the current conversation is generated and a current graph embedding is generated for the current control flow diagram. At least one previous graph embedding, nearest to the current graph embedding, is selected and corresponds to at least one previous conversation. A previous outcome of the at least one previous conversation is determined and a predicted outcome of the current conversation is determined based upon the previous outcome. When the predicted outcome is not positive, response outputs of the natural language interface for the current conversation are steered based upon the predicted outcome.

In another embodiment, a software product, has instructions, stored on computer-readable media, wherein the instructions, when executed by a computer, perform steps for natural language interface development. The software product includes instructions for receiving, from a natural language interface and for a plurality of conversations, conversational data including user utterances; instructions for classifying each of the conversations to determine intents for each of the user utterances; instructions for generating, for each of the conversations, a control flow diagram showing the intents and sequential flow of the conversation; and instructions for processing each of the control flow diagrams to generate a graph embedding representative of the conversation.

In another embodiment, a method ensures k-anonymity in shared conversation datasets. The method includes generating graph embeddings for each of a plurality of conversations from conversational data for N different users; determining at least one cluster of the graph embeddings using a clustering algorithm; determining number K of points in the at least one cluster; and sharing at least part of the conversational data corresponding to the at least one cluster when K is greater than or equal to N.

In another embodiment, a method provides efficient searching of conversations. The method includes generating graph embeddings for each of a plurality of conversations from conversational data for different users; determining at least one cluster of the graph embeddings using a clustering algorithm; determining a representative conversation of the at least one cluster; storing the representative conversation in a cache; and searching the cache to find the representative conversation based on input parameters.

In another embodiment, a method identifies change in conversations at a natural language interface. The method includes generating first graph embeddings for each of a plurality of conversations from different users received at the natural language interface during a first period; determining, using a clustering algorithm, first cluster data including at least one cluster of the first graph embeddings; generating second graph embeddings for each of a plurality of conversations from different users received at the natural language interface during a second period; determining, using the clustering algorithm, second cluster data including at least one cluster of the second graph embeddings; and comparing the first cluster data and the second cluster data to detect changes in the conversations over time

BRIEF DESCRIPTION OF THE FIGURES

FIG. 2 is a table showing example conversational data captured by the natural language interface of FIG. 1;

FIG. 4 is a table showing conversational data, which is based upon the conversational data of FIG. 2, and further includes intent determined by the natural language analyzer of FIG. 3, in embodiments;

FIGS. 13A-13C are graphs representing one example time series illustrating changes in clustering of graph embeddings and corresponding centroids over time, in embodiments.

DETAILED DESCRIPTION OF THE EMBODIMENTS

Conversational data may be formed from transcripts of a conversation between a user and another entity (e.g., another person or an artificial intelligence interface). The conversational data may include at least one utterance by the user (e.g., a textual transcript of what the user said), a conversation ID that identifies, in a unique way, a conversation that the utterance is part of, a user ID that identifies, in a unique way, the user having the conversation, and a timestamp that defines when the user utterance occurred. A natural language interface may be built to allow the user to communicate (verbally or textually) with a machine, for example. However, for the machine to understand the conversation, the conversational data is analyzed to derive meaning from the user's utterances. Developing the natural language interface is complex and often required insight from the developer. The embodiments described herein provide tools and analysis for developing the natural language interface to better understand the conversational data.

Natural Language Interfaces

Figure 1:
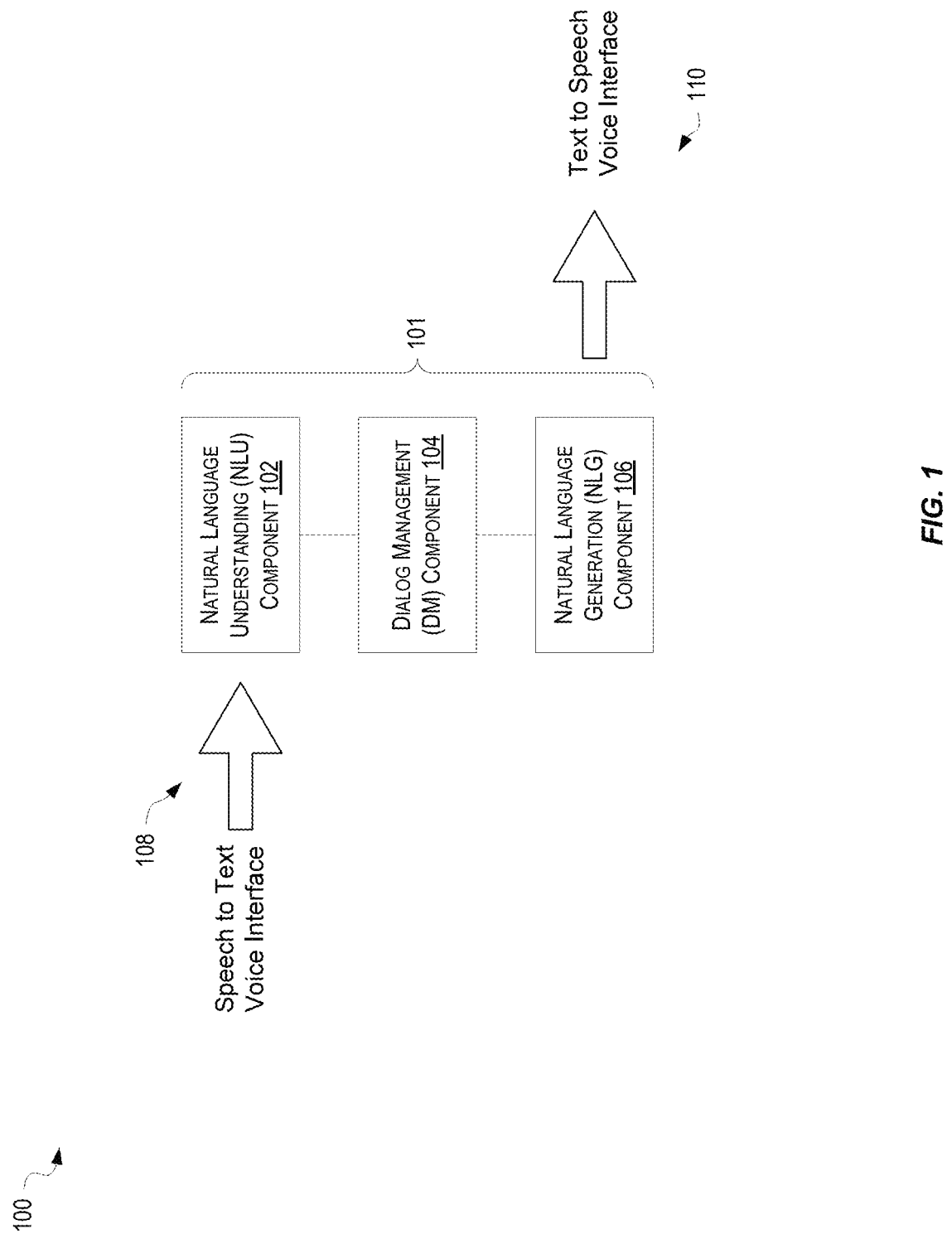
FIG. 1 is a high-level view of a natural language interface, in an embodiment.

FIG. 1 is a high-level view of a natural language interface 100 formed as a three-component stack 101. Natural language interface 100 may represent a voice interface, such as Google Home, and Siri, and may also represent a chatbot (e.g., where the user interacts through a web interface). Three-component stack 101 includes a Natural Language Understanding (NLU) component 102, a dialog management (DM) component 104, and a Natural Language Generation (NLG) component 106. A user utterance 108 is input to NLU component 102 as a textual transcript of what a user types and/or says. A natural language textual response 110 is determined by DM component 104 and output by NLG component 106, such as by transforming it into speech for voice interfaces.

NLU component 102 receives the user utterance as an input. Less recent implementations of this component used rule-based methodologies, such as keyword matching, to determine the user meaning, and thus the user intent. More recent implementations of NLU component 102 may include Rasa, Lex (Amazon), LUIS (Microsoft), Watson Conversation (IBM), and DialogFlow (Google), that use supervised machine learning algorithms to determine the user intent and may also determine entities that are representations of real-world objects. In one example of use, a bank implements natural language interface 100 as an initial customer contact point (e.g., as online chat or as an automated telephone interface). A user may interact with natural language interface 100 as if conversing with a person. For example, a user utterance of "What is the balance in my checking account?" should be classified as (e.g., determined as having intent of) "PersonalAccountsIntent," with identified entities of "balance" and "checking account." NLU component 102 may also provide a confidence score that allows the determined intents (and/or the determined entities) for the utterance to be ranked according to confidence of the classification. In one embodiment, NLU component 102 may select the highest ranked intent and entities, along with their confidence scores, for the utterance. In another embodiment, NLU component 102 may provide a list of possible intents, each with a corresponding ranking. In certain embodiments, NLU component 102 may include additional functionality, such as sentiment analysis and language identification.

NLG component 106 receives information for output from DM component 104 (and/or other possible outputs feeds) and selects a right type of response to return to the user. The selected response may also include an action and any data associated with that action. Continuing with the example above, the response may include an action of inform_account_info with data being a balance of the user's account (when the user has an account with the bank).

Certain, less recent, implementations of NLG component 106 use only rule-based state transition systems, where the states encode user utterances, intents, and other types of information required by the DM system, e.g. demographic information of users. Certain, more recent, implementations of NLG component 106 use machine-learning algorithms, including Reinforcement Learning algorithms, and/or supervised machine learning for best next action prediction.

Where the response includes an action, NLG component 106 outputs the actual natural language that will be returned to the user. Continuing with the above example, in response to the inform_account_info action, NLG component 106 may generate a natural language text that include the additional data indicative of the balance of the user's account, such as "Your balance is X."

Conversational Analytics

Figure 3:
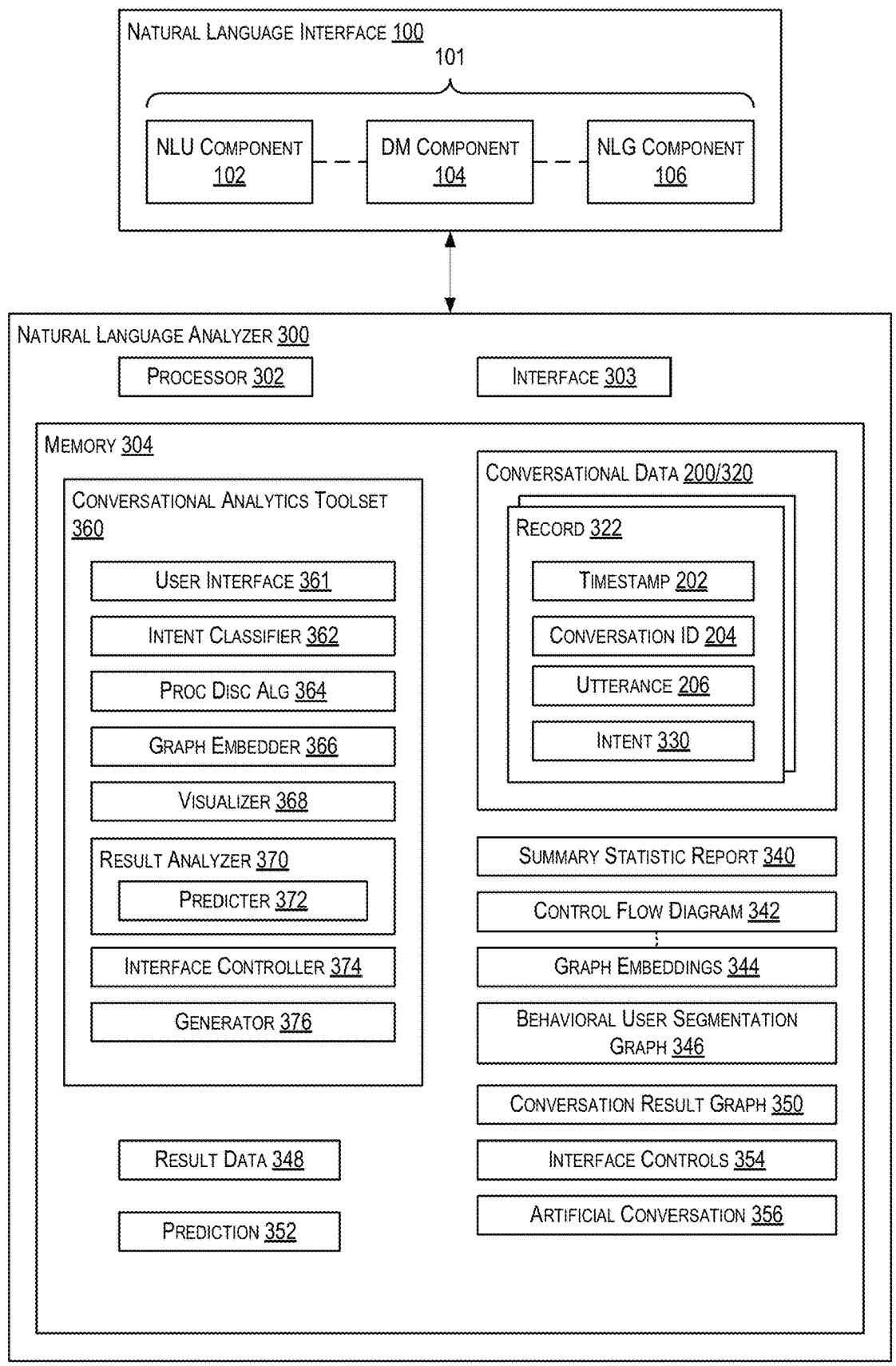
FIG. 3 is a schematic illustrating one example natural language analyzer for representing conversational flows as graph embeddings, and for conducting classification and clustering based on such embeddings, in embodiments.
Figure 5:
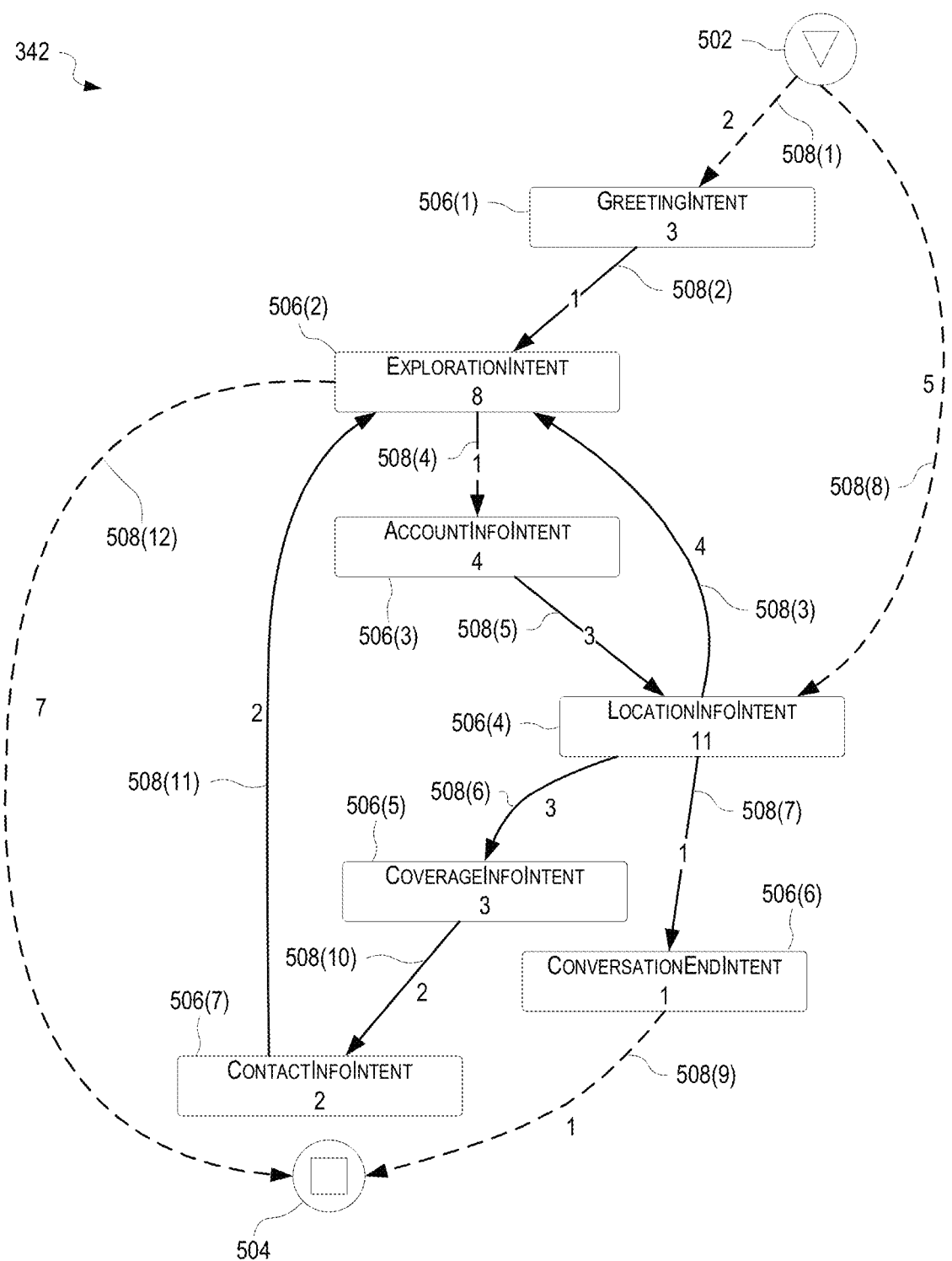
FIG. 5 graphically shows one example control flow diagram of FIG. 3, in embodiments.

FIG. 2 is a table showing example conversational data 200 captured by the natural language interface 100 of FIG. 1. FIG. 3 is schematic illustrating one example natural language analyzer 300 for representing conversational flows as control flow diagrams 342 with graph embeddings 344, and for conducting classification and clustering based on the graph embeddings 344. One example control flow diagram 342 is shown in FIG. 5. Natural language analyzer 300 is for example implemented by one or more digital computers that include at least one processor 302 communicatively coupled with memory 304. FIG. 4 is a table showing conversational data 320 that is based upon conversational data 200 of FIG. 2, and that further includes intent 330 determined by the natural language analyzer of FIG. 3. In the example of FIGS. 2 and 4, ExplorationIntent is an intent about what type of insurance the customer is interested in; AccountInformIntent is an intent determining whether the customer is a known or new customer; LocationInformIntent is an intent determining the location of residence of the customer; CoverageInformIntent is an intent determining the coverage the customer is interested in; ContactInfoIntent is an intent for when the customer provides their contact information; and EndConversationIntent is an intent reflecting that the customer is ending the conversation. FIGS. 2, 3, 4 and 5 are best viewed together with the following description.

A developer may design and develop natural language interface 100 in an iterative manner, where a standard configuration of components 102, 104, 106 is initially deployed and then at least one of components 102, 104, 106 is then refined by reviewing conversational data from transcripts of at least one user interacting with natural language interface 100, along with other available data on the at least one user, such as corresponding demographic information etc.

Natural language analyzer 300 may include an interface 303 for communicating with, configuring, and controlling, natural language interface 100. For example, interface 303 may receive conversational data 200 from natural language interface 100, and control one or more of NLU component 102, DM component 104, and NLG component 106 to steer conversations between the user and the entity.

A conversational analytics toolset 360, stored in memory 304, is for example software that includes machine-readable instructions that, when executed by processor 302, control processor 302 to provide functionality of natural language analyzer 300 as described herein. Conversational analytics toolset 360 includes a user interface 361 that allows a developer of natural language interface 100 to interactively use functionality of conversational analytics toolset 360 to analyze how conversations (e.g., stored as conversational data 200/320) are handled by natural language interface 100, identify gaps in the natural language processing, and learn how natural language interface 100 may be improved. Particularly, conversational analytics toolset 360 provides the developer with insight into how well natural language interface 100 is working by analyzing entire conversations and providing better understanding of why certain conversations succeed while others fail.

Conversational analytics toolset 360 includes an intent classifier 362, a process discovery algorithm 364, a graph embedder 366, a visualizer 368, a result analyzer 370 with a predictor 372, and an interface controller 374. Toolset 360 may be invoked to process conversational data 200 and generate one or more of conversational data 320 with intent 330, a summary statistics report 340, a control flow diagram 342 with graph embeddings 344, a behavioral user segmentation graph 346, a conversation result graph 350, and a prediction 352.

Toolset 360 analyzes results of conversations to make predictions 352 of outcomes of real-time conversations and may generate interface controls 354 that may be sent to natural language interface 100 to steer conversations towards a desired outcome. That is, toolset 360 may control natural language interface 100 to steer conversations towards more positive results, thereby improving the quality of natural language interface 100.

Toolset 360 invokes intent classifier 362 to process utterances 206 of conversational data 200, received via interface 303 from natural language interface 100, and generate conversational data 320 that includes a plurality of records 322, each having timestamp 202, conversation ID 204, utterance 206 and intent 330.

Toolset 360 invokes process discovery algorithm 364 to process conversational data 320 and generate control flow diagram 342 to represent an entire conversation. Examples of process discovery algorithm 364 may include: fuzzy miner, inductive miner, heuristic miner, alpha miner, and a selected combination thereof. Control flow diagram 342 is a directed graph (e.g., G=(V,E)) and may be called a process map or a directly-follows-graph (DFG) in the art of process mining. In FIG. 5, intents 506 are indicated by rectangular nodes and circular vertices 502 and 504 represent start and end points, respectively, of conversations. The number appearing within each intent 506 indicates how many times that intent appears in conversational data 320. The directed edges 508 (E) connect a source intent 506 with a target intent 506 to model a sequential flow of the conversation. For example, directed edge 508(2) connects source intent 506(1) to target intent 506(2). Accordingly, target intent 506(2) directly follows source intent 506(1) in the conversational flow of conversational data 320.

Toolset 360 invokes graph embedder 366 to transform control flow diagram 342 into a vector of 'n' dimensions, referred to as graph embedding 344. Graph embedder 366 captures fundamental properties of control flow diagram 342, including topology, relationships between nodes or group of nodes, and so on, and thereby defines an entire conversation as a single vector. Prior art comparisons were limited to utterances or phrases. Accordingly, graph embeddings 344 of many different conversations may be efficiently stored and may be evaluated to determine whether conversations are similar or different. That is, an angle between two, or more, vectors of graph embeddings 344 indicates closeness of the conversations defined by those graph embeddings 344 (and corresponding control flow diagrams 342). Specifically, each graph embeddings 344 represents a conversation, and graph embeddings 344 may be compared, using conversational analytics toolset 360, to identify (e.g., by closeness of vectors in an n-dimensional space) a previous conversation that is similar to a current conversation for example.

Dimensionality of vectors is typically determined empirically between 50 and 150, based on how well distances between vectors capture similarities between graphs. Graph Kernels, which may also be used to determine similarity between graphs, is similar to graph embedding, but are manually crafted. Both graph kernels and graph embeddings may be used by conversational analytics toolset 360, however, embodiments and examples described herein focus on graph embeddings. Graph embedder 366 maps similar graphs to vectors that are closer in space (e.g., the angle between vectors of similar graphs is smaller compared to the angle between vectors of less similar graphs). Advantageously, vectors representing process maps may be used as features for classification algorithms and/or for clustering algorithms, and therefore, as described in more detail below, graph embeddings 344 may also be used for classification and clustering. Vectors defined by graph embeddings 344 significantly improve performance of subsequent analysis of conversational data 320.

As noted above, control flow diagram 342 is an attributed directed graph, where the attributes define additional data in both the nodes and the edges of the graph, and where a direction of each edge between two nodes is important (e.g., edges are directed). In the example of FIG. 5, the number in each node indicates how many times that intent appears in different conversations and the number on each edge (between intents) indicates how many time a transition between that specific ordered pair of intents occurs in conversations. Each node and/or edge may store additional information without departing from the scope hereof. In certain embodiments, graph embedder 366 may capture this additional information (in addition to the topological structure of the graph) in graph embeddings 344 to improve accuracy of the vectors representing the graph and thereby allow similarity in conversations to be determined more accurately between two different control flow diagrams 342.

Figure 6:
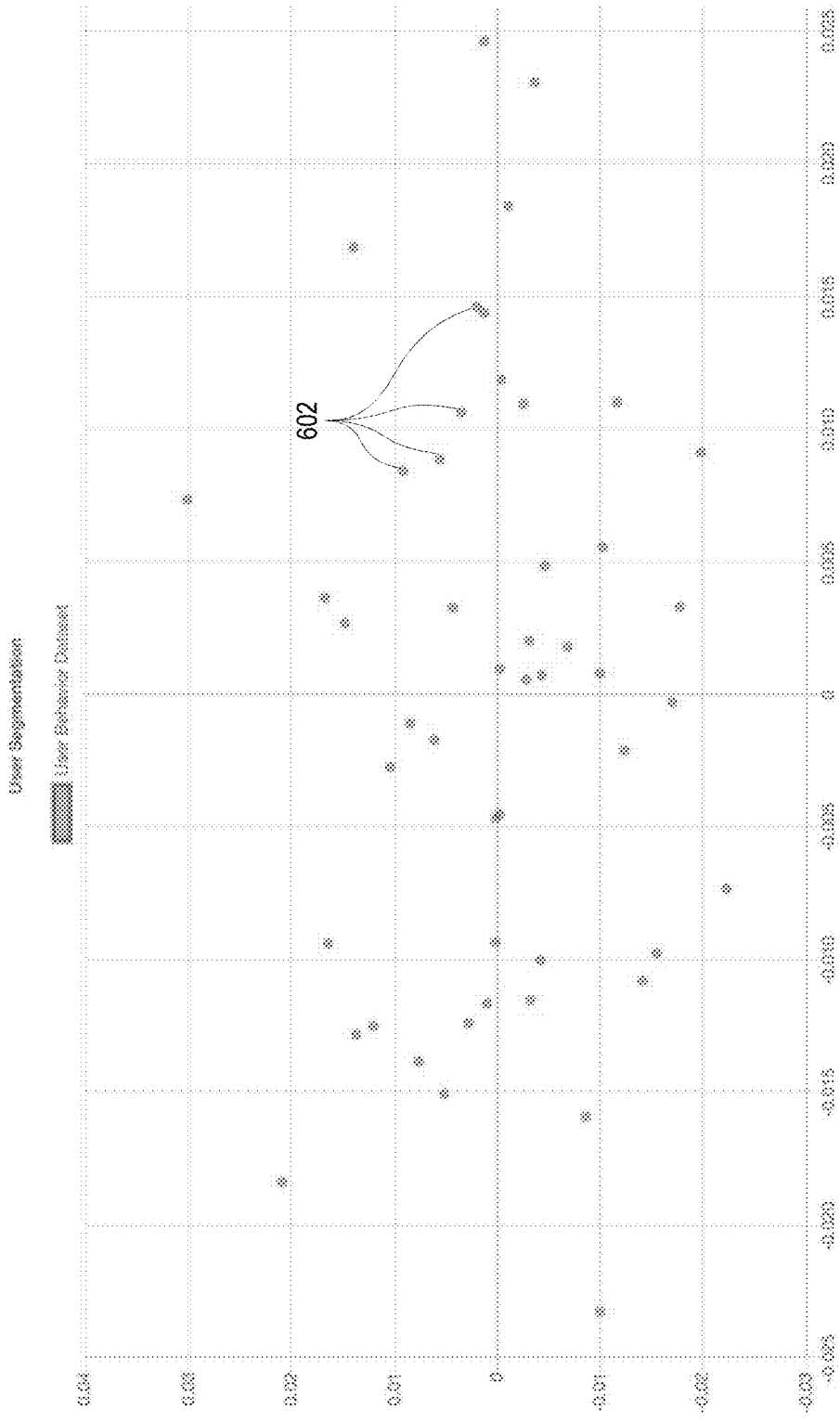
FIG. 6 shows one example behavioral user segmentation graph, in an embodiment.

Toolset 360 may invoke visualizer 368 to generate behavioral user segmentation graph 346 that visually illustrates comparisons of a plurality of graph embeddings 344, each representative of intent within a different conversation. FIG. 6 shows one example behavioral user segmentation graph 346 generated by visualizer 368 based upon graph embeddings 344 of multiple users. Each dot 602 in behavioral user segmentation graph 346 represents an interaction a user has had with natural language interface 100 and is based upon the corresponding graph embeddings 344. That is, each dot 602 has a corresponding control flow diagram 342 with graph embeddings 344 defining a n-dimensional vector. A dimensionality reduction technique (e.g., PCA) is then used to reduce the number of dimensions from n to 2, such that the vectors of graph embeddings 344 may be visualized (as shown in FIG. 6). Dots 602 that appear close to one another in behavioral user segmentation graph 346 represent conversations of users that are similar. Advantageously, behavioral user segmentation graph 346 provides rapid assimilation of how well natural language interface 100 is operating and how well conversational data 320 is being evaluated.

Through use of toolset 360, a designer of natural language interface 100 may easily discern where gaps occur during evaluation of the conversational data. The designer of natural language interface 100 may wish to learn of intents 330 that are too generic, and thus where intent classifier 362 may be improved by breaking the one or more generic intents into additional intents that better define the conversation. For example, the natural language interface designer wishes to identify when the user is interested to learn more about different types of insurance policies, and creates the ExplorationIntent 506(2) of FIG. 5 to identify such user interests. However, after observing certain utterances 206 identified as having ExplorationIntent 506(2), the designer realizes that the users ask more specific questions about insurance policies, for example by asking questions about automobile insurance policies such as collision vs. liability coverage. For example, by clicking on one dot 602 in behavioral user segmentation graph 346, user interface 361 may display a user interface artifact (e.g., a pop-up window) showing control flow diagram 342 of that conversation (e.g., as shown in FIG. 5), and may also display corresponding transcriptions as well transcripts. Accordingly, the designer realizes that the ExplorationIntent may be refined and broken into additional intents, for example refine ExplorationIntent by creating the intents AutomobilePolicyExplorationIntent and HomePolicyExplorationIntent, and by using conversational analytic toolset 360, the designer may define these additional intents and may provide corresponding training data for them may be collected from interactions of users with the conversational interface, that asked the more specific questions. Specifically, conversational analytic toolset 360 reveals user conversations and utterances that are similar to an identified user conversation or utterance, thereby allowing the design to easily view transcripts of these revealed conversations and utterances to learn how new intents may be added to help characterize the utterance in greater detail. Conversational analytic toolset 360 also allows more accurate data to be collected for training intent classifier 362. The improved conversational interface may then be tested on the identified conversations where the gap occurred or is likely to occur.

Toolset 360 may invoke result analyzer 370 to evaluate conversational data 320 and graph embeddings 344 in view of result data 348 and to generate a conversational result graph 350. Advantageously, each conversation is represented by an n-dimensional vector and may be easily stored. Result data 348 may represent an outcome (e.g., positive or negative outcome) of a conversation (e.g., between a consumer and a sales person) defined by each conversational data 320. For example, result data 348 may be generated by other systems or devices (e.g., a retail system), not shown, that correlate conversational data 320 with sales data of a website. Result analyzer 370 may implement a supervised machine learning algorithm (e.g., one or both of SVM and Random Forest) that receive graph embeddings 344 and result data 348 as inputs and generates conversational results graph 350 to indicate which conversations resulted in sales and which conversations did not result in sales. By storing outcomes of the conversations (e.g., whether or not the conversation with the user resulted in sale a new mortgage, or not) with the conversation vector, the corresponding conversations may be quickly evaluated to determine which resulted in a positive outcome and which resulted in a negative outcome. This allows the designer of natural language interface 100 to further refine the intents 330 used by intent classifier 362 to improve outcome of the conversations.

Figure 7:
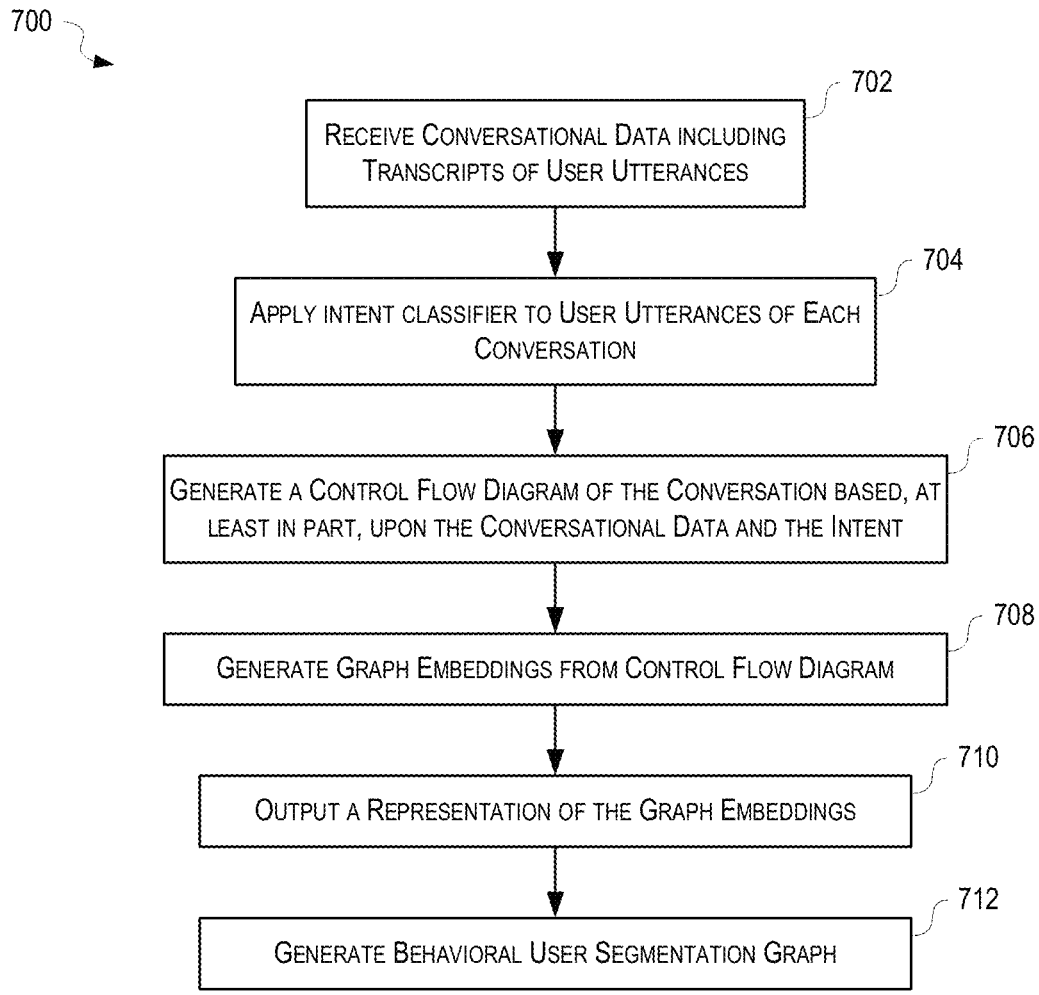
FIG. 7 is a flowchart showing one example method for representing conversational flows as graph embeddings, and to conduct classification and clustering based on such embeddings, in an embodiment.

Graph embedding stores properties of a graph as a vector or a set of vectors, such that these properties may be used in further processing. For example, embedding may capture the graph topology, vertex-to-vertex relationships, and other relevant information of the graph, subgraphs, and vertices. FIG. 7 shows one example method 700 for representing conversational flows as graph embeddings, and to conduct classification and clustering based on such embeddings. Method 700 is, for example, implemented in conversational analytics toolset 360 of natural language analyzer 300 of FIG. 3. A developer may use method 700 to implement, develop, and enhance natural language interface 100, FIG. 1, for use as a first customer contact point of an insurance company, for example.

In block 702, method 700 receives conversational transcripts. In one example of block 702, conversational analytics toolset 360 receives timestamps 202, conversation IDs 204, and utterances 206 from natural language interface 100 to form conversational data 320 within memory 304. In block 704, method 700 applies an intent classifier to the user utterance field of the conversational data to detect intent of each utterance. In one example of block 704, conversational analytics toolset 360 invokes intent classifier 362 to process utterance 206 of each record 322 of conversational data 320 to generate corresponding intent 330. In certain embodiments, block 704 may be omitted when intent classification is performed by an external process (e.g., as part of natural language interface 100).

In block 706, method 700 generates a control flow diagram of the conversation based upon the conversational data and the intent. In one example of block 706, conversational analytics toolset 360 invokes process discovery algorithm 364 to process timestamp 202, conversation ID 204, and intent 330 of each record 322 of conversational data 320 for a particular user to generate a control flow diagram 342 of the conversation.

In block 708, method 700 generates graph embeddings from the control flow diagram. In one example of block 708, conversational analytics toolset 360 invokes graph embedder 366 to generate graph embedding 344 from control flow diagram 342.

Block 712 is optional. If included, in block 712, method 700 generates a behavioral user segmentation graph containing the embedded graph generated in block 710. In one example of block 712, conversational analytics toolset 360 invokes visualizer 368 to generate behavioral user segmentation graph 346 that visually illustrates comparisons of a plurality of graph embeddings 344, each representative of intent within a different conversation.

Advantageously, the developer may use behavioral user segmentation graph 346 and control flow diagram 342 to better understand operation of natural language interface 100 and thereby further develop and improve natural language interface 100 for handling customer communications for the insurance company.

Real-Time Conversation Analysis and Prediction

Result analyzer 370 may invoke predictor 372 to generate predictions 352 of an outcome (e.g., whether the conversation will lead to a sale of a product) of a conversation as conversational data 320 from the conversation is received in real-time (e.g., as the conversations are happening) from natural language interface 100. Predicter 372 may, by comparing graph embeddings 344 of a current conversation with graph embeddings 344 of previous conversations, identify similar ones of the previous conversations. For example, vectors defined by the current graph embeddings may be compared to vectors of previous conversations, where vectors that have a similar direction indicate similar intent in previous conversations. By determining the outcome of these similar previous conversations, the predicter 372 may generate prediction 352 to indicate a likely outcome of the current conversation. Advantageously, result analyzer 370 and predicter 372 may be used to adjust a course of the conversation by "nudging" the user in a desired direction through responses based on prediction 352, thereby steering the conversation to desired result (e.g., sale of the product).

In one example of operation, natural language interface 100 is an initial point of communication for a mortgage brokerage. The user converses with natural language interface 100 until it is beneficial for a human sales agent to take over the conversation. To make it more likely that the user, during the conversation with natural language interface 100, accepts an offer to converse with a human sales representative, the interface controller 374 may invoke result analyzer 370 and/or predicter 372 to generate prediction 352 indicative of whether the current conversation indicates that the user is ready to converse with the human sales representative. For example, predicter 372 uses graph embedding 344 of the user's current conversation to identify other user conversations that are similar, and when the outcome of these similar conversations indicates a positive result (e.g., the result indicates that the user spoke with the human sales agent), then the interface controller 374 may instruct natural language interface 100 to ask whether the user would like to talk with the human sales agent. However, where the results of similar conversations are not positive (e.g., do not indicate that users of similar conversations wanted to talk with a human sales agent), interface controller 374 may direct the natural language interface 100 to continue the conversations with the user, asking more specific questions of the user, for example. Interface controller 374 may determine the likelihood of the user accepting the offer to talk with the human sales representative early in a conversation, and thereby direct natural language interface 100 to ask certain questions that may steer the conversation towards the current goal (e.g., of accepting the offer to talk with the human sales agent).

Particularly, interface controller 374, based upon prediction 352, may change behavior of DM component 104 and/or NLG component 106 of three-component stack 101 to steer a current conversation towards the desired result. In one embodiment, interface controller 374 generates interface controls 354 based, at least in part, upon graph embeddings 344 of control flow diagrams 342, and prediction 352.

Interface controller 374 sends interface controls 354, via interface 303, to DM component 104 and/or NLG component 106 of natural language interface 100.

Advantageously, result analyzer 370 and predicter 372 may be used with machine learning algorithms to improve performance (e.g., learn), over time, of DM component 104 to improve outcome of conversations handled by natural language interface 100.

Conversational analytics toolset 360 may also include an artificial conversation generator 376 that may be invoked to generate an artificial conversation 356 based upon one or more control flow diagrams 342 of previous conversations. Artificial conversation generator 376 may process control flow diagram 342 and generate a new sequence of intents, which may include new intents, that may not have been previously observed. Based upon this new sequence of intents, artificial conversation generator 376 may generate artificial conversation 356 using corresponding user utterances from the previous conversations. In certain embodiments, user interface 361 may allow the designer to interact with artificial conversation generator 376 to ensure that artificial conversation 356 makes sense. Accordingly, toolset 360 facilitates generation of artificial conversation 356 that may be used to further develop natural language interface 100.

Figure 8:
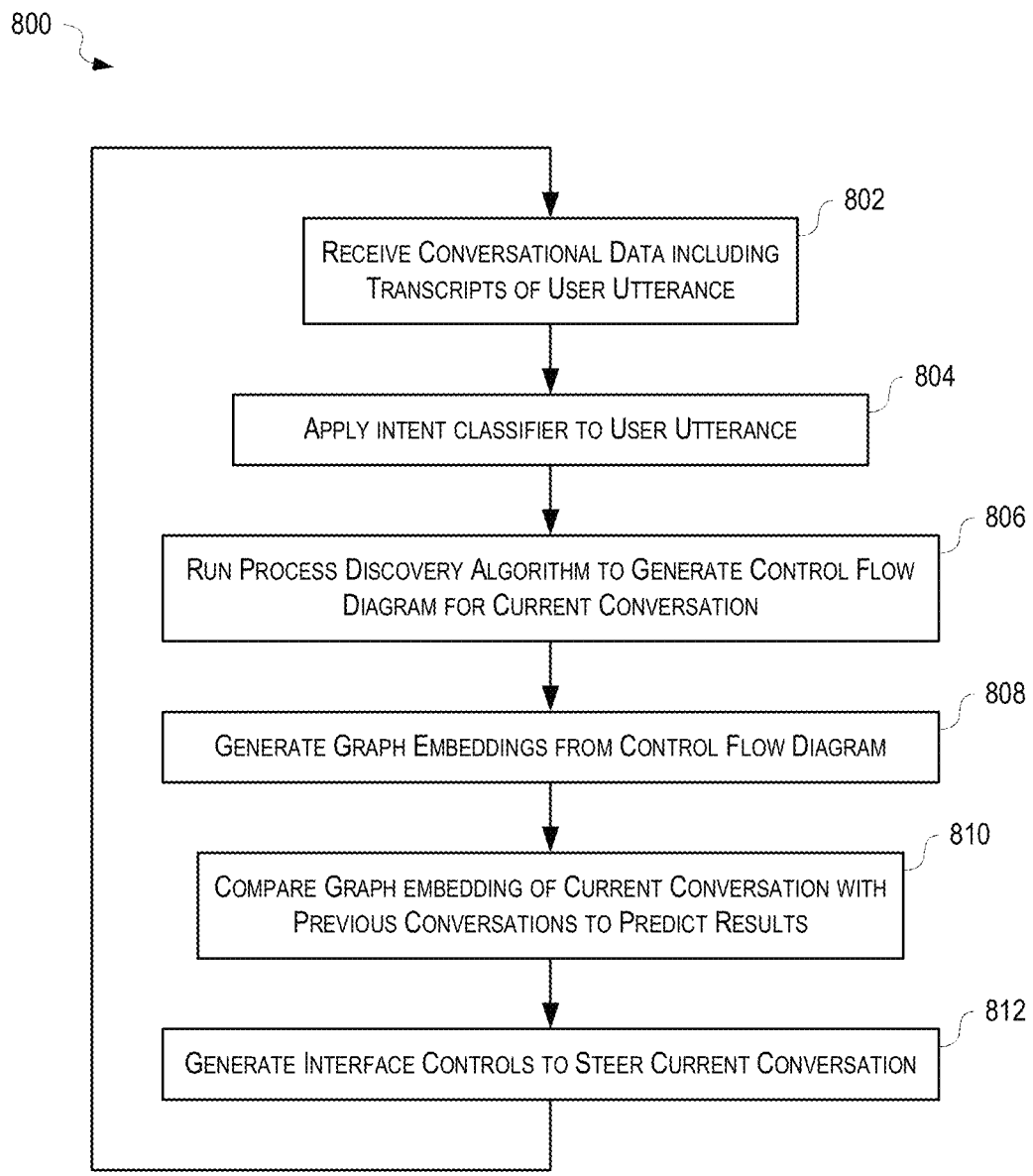
FIG. 8 is a flowchart illustrating one example method for real-time analysis of conversations, in an embodiment.

FIG. 8 is a flowchart illustrating one example method 800 for real-time analysis of a conversation. Method 800 may be implemented in result analyzer 370 of toolset 360 running on natural language analyzer 300 of FIG. 3. Where natural language interface 100 implements a first point of contact for customers of an insurance company, method 800 may be used to improve an outcome of a conversation of a customer with natural language interface 100 by steering that conversation towards a more positive result.

In block 802, method 800 receives conversational data including a transcript of a user's utterance. In one example of block 802, toolset 360 receive conversational data 200, including utterance 206, via interface 303 from natural language interface 100. In block 804, method 800 applies an intent classifier to the user utterance. In one example of block 804, toolset 360 invokes intent classifier 362 to process utterance 206 received in block 802 and to generate a corresponding intent 330. In certain embodiments, block 804 may be omitted when intent classification is performed by an external process (e.g., as part of natural language interface 100). In block 806, method 800 runs a process discovery algorithm to generate a control flow diagram for the current conversation. In one example of block 806, toolset 360 invokes process discovery algorithm 364 to generate control flow diagram 342 for the conversation that includes utterance 206 received in block 802 and intent 330 generated in block 804. In block 808, method 800 generates graph embeddings from the control flow diagram. In one example of block 808, toolset 360 invokes graph embedder 366 to generate graph embeddings 344 from control flow diagram 342 generated in block 806.

In block 810, method 800 compares the graph embeddings for the current conversation with graph embeddings of previous conversations to predict results. In one example of block 810, toolset 360 invokes result analyzer 370 and predicter 372 to generate prediction 352 based, at least in part, upon conversational result graph 350, result data 348, and graph embeddings 344 of the current conversation. In block 812, method 800 generates interface controls to steer the current conversation. In one example of block 812, toolset 360 invokes interface controller 374 to generate interface controls 354 based, at least in part, upon one or more of control flow diagram 342, graph embeddings 344, and prediction 352, and to send interface controls 354, via interface 303, to DM component 104 and/or NLG component 106 of natural language interface 100. Advantageously, use of method 800 steers the conversation between the customer and natural language interface 100 towards a more positive outcome, such as where the customer buys an insurance policy from the company for example.

Application of Embedding for Privacy and In-Time Series

As noted above, when sharing conversational datasets there are a few challenges that may arise: privacy and anonymization, size of data released/summarization of conversational data shared and caching for more efficient search, estimating the quality of conversational data in terms of diversity and repetitiveness, and monitoring conversational interfaces over time.

Figure 9:
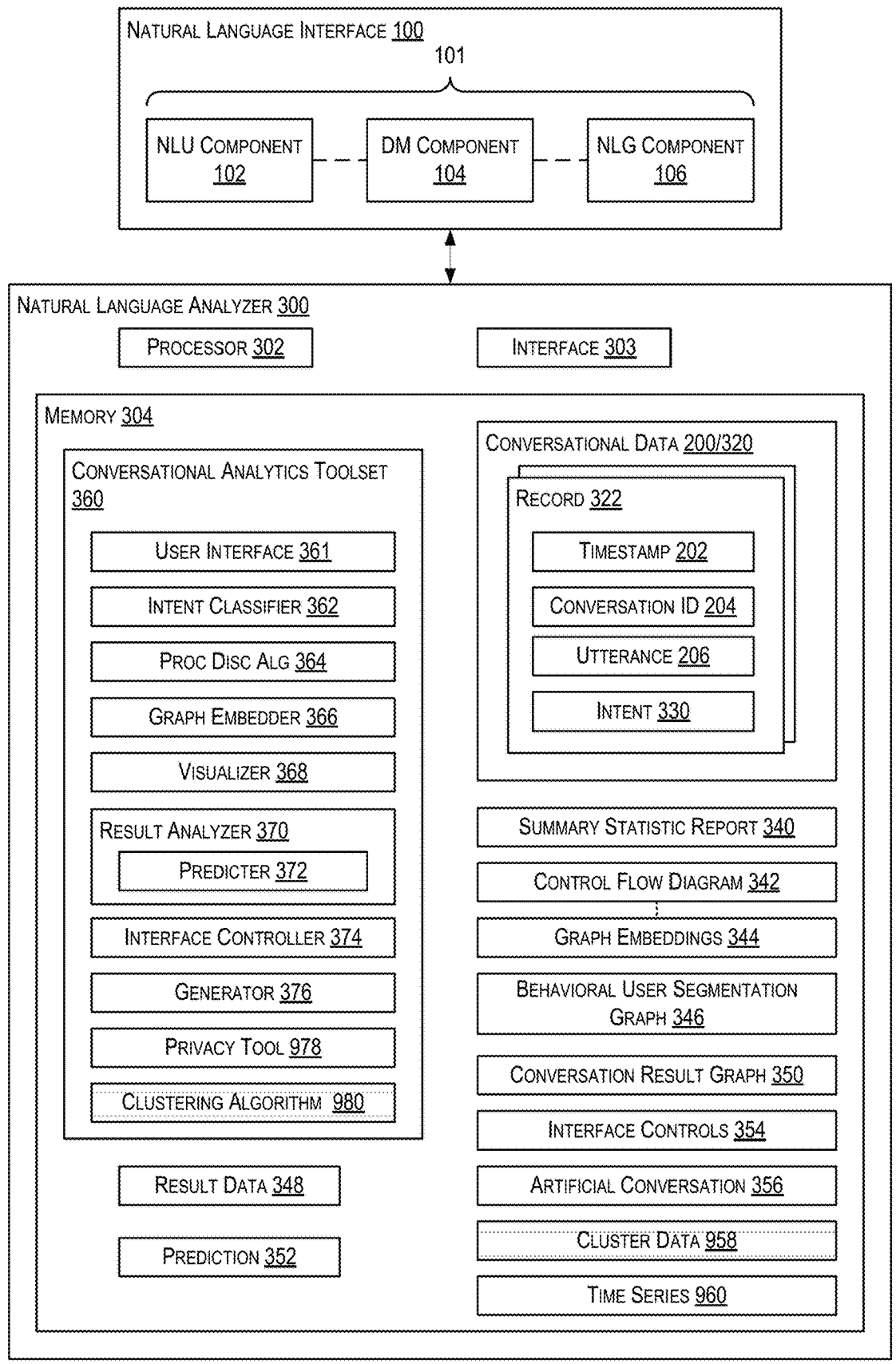
FIG. 9 shows the conversational analytics toolset of the natural language analyzer of FIG. 3 further including a privacy tool and a clustering algorithm, in embodiments.

FIG. 9 shows conversational analytics toolset 360 of natural language analyzer 300 of FIG. 3 further including a privacy tool 978 and a clustering algorithm 980. Although shown as part of conversational analytics toolset 360, privacy tool 978 and/or clustering algorithm 980 may be separate from conversational analytics toolset 360, and may operate in another computer, different from natural language analyzer 300, without departing from the scope hereof. Conversational analytics toolset 360 invokes clustering algorithm 980 to process graph embeddings 344 and invokes privacy tool 978 to ensure privacy and anonymity of information output by natural language analyzer 300. Clustering algorithm 980 may implement one or both of k-means or k-medioids.

Clustering algorithm 980 clusters conversations with similar conversational flows and then selects a conversation from each cluster that "best" represent the conversational flow of that cluster. Properties of conversational flow embeddings result in conversations in the same cluster sharing a similar conversational flow and therefore one or a few conversations from one cluster may be used to represent the other conversations in that cluster. In the following description, a "data point" or "point" refers to a conversational embedding that was obtained by k-means and/or k-medioids, which are examples of popular clustering algorithms that may be used to cluster embedded conversations. Both k-means and k-medioids are iterative algorithms that take k, the number of expected clusters, as an input parameter. These algorithms work in an iterative manner, by attributing a cluster to each data point. The k-means algorithm represents each cluster by a point that is the mean of all data points belonging to the cluster. The mean of which cluster is calculated by averaging the data points in the cluster by dimension. This is possible because the conversational embedding (e.g., by graph embedder 366, FIGS. 3 and 9) produces vectors of real numbers. The mean for each cluster obtained this way is not typically one of the actual conversational embeddings. The k-medioids algorithm, on the other hand, represents each cluster as one of the input points (e.g., one of the embeddings).

Both k-means and k-medioids algorithms then seek to minimize the distances between points attributed to the same cluster. This is done by calculating, for each data point, its distance to each one of points representing the other clusters. If it is found that assigned the distance is smaller than that of the distance to the point representing the current cluster, then the data point is assigned to this new cluster. This process repeats iteratively until there are no assignment changes, or a maximum number of iterations (e.g., set ahead of time) is attained. The parameter k may be determined by an initial guess. This may be facilitated by using a dimensionality reduction algorithm such as Principal Component Analysis (PCA) or t-distributed stochastic neighbor embedding (t-SNE), projecting the data points into 2 or 3 dimensional spaces and then visualizing the projected points. The k parameter may also be estimated in a more automated fashion as described in "Estimating the number of clusters in a data set using the gap statistics" by R. Tibshirani, G. Walther, and T. Hastie in Journal of Royal Statistical Society 2001, pp 411-423. https://web.stanford.edu/~hastie/Papers/gap.pdf.

Privacy tool 978 includes machine-readable instructions that when executed by processor 302, cause processor 302 to ensure that summary statistic report 340, control flow diagram 342, graph embeddings 344, behavioral user segmentation graph 346, and conversation results graph 350 cannot be used to identify any individual having the conversation. As mentioned above, text of a conversation may contain PII that directly identifies, and/or allows someone to determine the identity of, a person having the conversation. For example, the conversation may include an address, a phone number, an email etc. It is therefore common practice to identify and remove such PII prior to sharing information of the conversation. However, removal of PII may not be enough to anonymize the information in the conversation since the identity of the person in the conversation may be determined by fusing a few datasets together. For example, when there is a service outage in a certain area and users of the service interact with a conversational interface to report the outage and/or ask for resolution, even when PPI is removed from the conversation text, the contextual significance of the area, particularly when it is small, may allow the person having the conversation to be identified. To avoid this unintentional leaking of personal information, the concept of k-anonymity was introduced. See [Samarati, Pierangeli; Sweeney, Latanya (1998). "Protecting privacy when disclosing information: k-anonymity and its enforcement through generalization and suppression" (PDF). Harvard Data Privacy Lab.], incorporated herein by reference. The concept of k-anonymity ensures the datasets being shared are sufficiently large to include enough people (as defined by the parameter k) such that it is difficult to identify any one person from the datasets. Accordingly, privacy tool 978 is invoked to determine whether summary statistic report 340, control flow diagram 342, graph embeddings 344, behavioral user segmentation graph 346, and conversation results graph 350 conforms to the k-anonymity concept, prior to output or sharing of the information for example.

Textual content of conversations typically includes personally identifying information (PII), which is sensitive private information that a person or small group of people may not wish to disclose, including information that may lead to the person or group of people being identifiable, information about a nature of the conversation, and other sensitive information about the person or group. Examples of PII include email addresses, postal addresses, zip codes, first names, last names, income, and so on. Such information is typically organized along "attributes" or "dimensions". For example, where zip code is one dimension, email may be another dimension. Thus, even when an explicit email address and first and last names are not included in a dataset, by cross referencing a few dimensions, it may be possible to discern specific user identities from a pool of many users in a conversational interface. For example, a data set may not include a surname, but when a user has a relatively unique first name and resides in zip code where such a name is not common, it may be possible to infer the full identity of the user by narrowing down the possible users with such information. There are different common solutions for reducing the risk of PII leakage. One common and basic solution is to identify and remove/or obfuscate PII attributes such as names, emails, telephone numbers, zip codes, city and state names, etc.

Beyond explicit PII, there are other aspects of conversational datasets that may lead to unintentional release of information about a person involved in the conversation. To prevent this, an additional approach may seek to achieve k-anonymity by ensuring that the conversational data being shared includes at least k users for each combination of different dimensions. For example, by ensuring that there are at least k users from a certain state within a certain age range and of a specific gender, avoids possible biases that may be used to further infer or narrow down user identities. Larger k values may reduce information leakage and increase anonymity.

Another dimension not addressed in prior approaches that may reveal information about a person is structure and/or flow of a conversation. For example, cross referencing externally known events (e.g., winter storms and publicly known maintenance work schedules in certain areas) with conversations reporting or commenting on these events may allow a third party to narrow down location information of the person having the conversation. Accordingly, it is beneficial to group conversations by similar flow/structure and ensure that there are at least k users having same combination of conversations in each "flow/structure" group in combination with other attributes such as location, age range, etc. Advantageously, the embodiments described herein facilitate grouping of all conversations by the same user and then generating embeddings for them. These embeddings are then clustered using a clustering algorithm such as K-means (note that the K of K-means is not the same k as in k-anonymity) such that each cluster constitutes a conversational-flow similarity group, which is considered an attribute. This attribute may then be combined/cross reference with other attributes about users, such as location, age range, etc. to create a new grouping of users along those combined dimensions. Then only conversations which correspond to groups sized at least k persons may be shared. PII information of other attributes may then be removed/obfuscated as described above.

Figure 10:
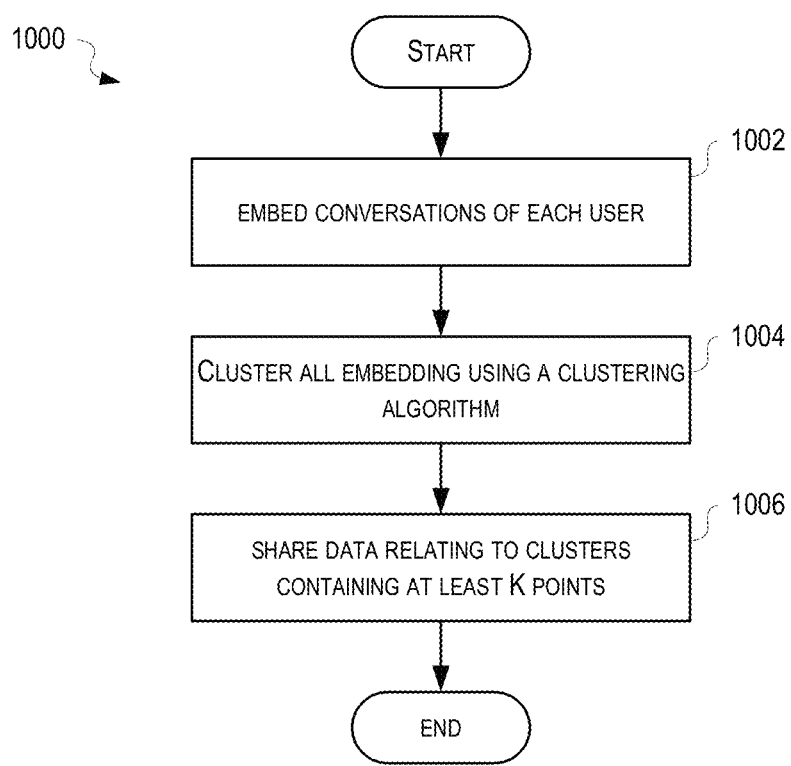
FIG. 10 is a flowchart illustrating one example method for protecting the privacy of users in shared conversational data, in embodiments.

FIG. 10 is a flowchart illustrating one example method 1000 for protecting the privacy of users (e.g., people having conversations) in shared conversational data. Method 1000 is implemented, at least in part, by privacy tool 978 of FIG. 9. In block 1002, method 1000 embeds conversations for each user. In one example of block 1002, conversational analytics toolset 360, FIG. 3, invokes method 700, FIG. 7, to process conversational data 200/320 and generate graph embeddings 344. In block 1004, method 1000 clusters all embedding using a clustering algorithm. In one example of block 1004, conversational analytics toolset 360 invokes clustering algorithm 980 to process graph embeddings 344 and generate cluster data 958 defining K points for each cluster. Clustering algorithms k-means and k-medioids are examples of clustering algorithm 980. In certain embodiments, K points may be selected by the user interacting with a user interface displaying a cluster, whereby points selected from the cluster are used to determine the k-anonymity requirement. Conversational analytics toolset 360 does not share conversations of clusters that do not meet the k-anonymity requirement and may inform the user of clusters not meeting this requirement.

In another embodiment, privacy tool 978 may automatically select K points from each cluster at random. In another embodiment, privacy tool 978 calculates Euclidean distances of each point in the cluster to the cluster centroid (in the K-means sense) and then selects the K points closest to the centroid (e.g., by sorting them in descending order and picking the first K points). In another embodiment, privacy tool 978 calculates Euclidean distances of each point in the cluster to the cluster centroid, sorts the list based on their distances to the centroid, with a maximum distance denoted as m. Then, privacy tool 978 bins the points based on their distances as a percentage of m. These percentage bins may be configurable with a default option being 0-25%, 25%-50% (median), 50%-75%, and 75%-100%. After each point is attributed to a bin, the size ni and centroid of the bin is calculated (in the K-means sense). This process is then repeated for each bin, generating at least one sub-bin for each bin. Each bin contributes K/ni points that are selected by picking one point at random from each sub-bin, starting with the bin furthest from the centroid (75%-100% of m for the default configuration), then picking at random from the next bin (50%-75%)—and repeating in a round robin fashion until K points are selected.

In certain embodiments, privacy tool 978 presents each cluster, indicating the K selected points, to the user, allowing the user to overridable the automatic selection, such as by making changes or declining the point selection.

In block 1006, method 1000 shares only data relating to clusters containing at least K points. In one example of block 1006, conversational analytics toolset 360 only shares conversational data 200/320 related to clusters within cluster data 958 having at least K points (e.g., persons/user IDs). In certain embodiments, conversational analytics toolset 360 prevents sharing of conversational data of clusters having fewer than K points. The shared conversational data 200/320 may include a few conversations sampled from the cluster or may include a conversation represented by the embedded centroid of the cluster (or closest to the centroid). This process may be repeated for conversations filtered on a certain dimension, or a combination of dimensions, of the meta data to make sure the certain dimension, or the combination of dimensions, does not include clusters with a size less than K. For example, this process ensures that certain combinations of zip code and gender do not narrow the space of similar conversations (within a cluster) such that the conversational data allows the identify the user to be determined.

More Efficient Search

Conversational datasets may be large in their size where many conversations are collected simultaneously and/or collected over long periods. However, conversations are often repetitive and contain information that is similar structure-wise (in terms of common sequences of intents). Accordingly, such repetitive conversations are redundant, and it may be unnecessary to share an entire dataset among practitioners. Rather, it may be sufficient to subsample the data set before sharing. One way to achieve this is to embed conversations (e.g., generate graph embeddings of each conversation), cluster the embedded conversations, and then take only a few conversations representative for each cluster (correspond to the graph embeddings in each cluster). The compression benefit here is independent of privacy/anonymity, but privacy/anonymity can be applied here by processing the conversational text is to remove or obfuscate the PII as discussed earlier. In some cases, users may wish to encrypt the conversational data and that is also a possibility.

Figure 11:
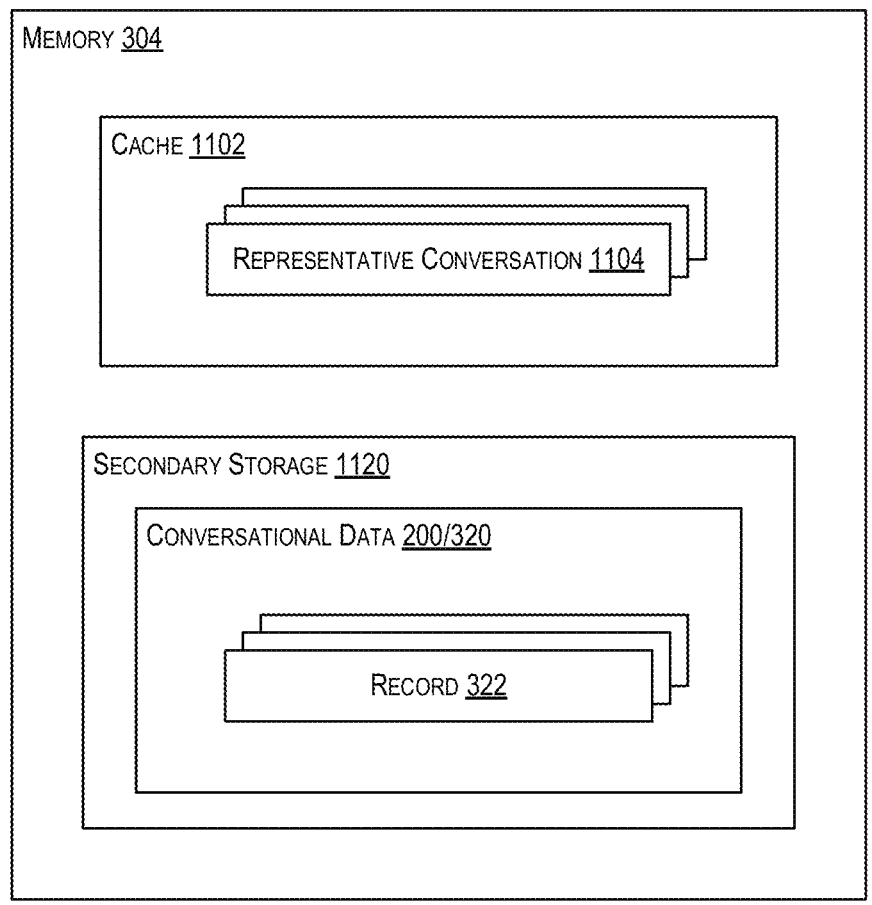
FIG. 11 is a schematic diagram showing the memory of FIG. 9 further implementing a cache storing representative conversations and implementing secondary storage storing conversational data, in embodiments.

This approach may also be used to cache conversational data. FIG. 11 is a schematic diagram showing memory 304 of FIG. 9 further implementing a cache 1102 storing representative conversations 1104 and implementing secondary storage 1120 storing conversational data 200/320. In certain embodiments, cache 1102 is performant (e.g., fast access memory) but is limited in size and secondary storage is larger but has slower access. Representative conversations 1104 are derived from clustered graph embeddings and may be rapidly searched for initial coarse information retrieval. Advantageously, representative conversations 1104 derived from clustered graph embeddings 344 remove redundant (e.g., repetitive) information to allow representative (coarse) searches to be performed rapidly. Conversational data 200/320 may be retrieved from secondary storage 1120 to perform a more refined search.

Estimating the Quality of Conversational Data in Terms of Diversity and Repetitiveness Conversational data 200/320 may be filtered, based on any metadata dimension, an outcome variable, or a combination of dimensions and/or outcome variables, and the filter result processed to generate graph embedding 344 of the conversations for each value of the filter. The graph embeddings 344 may then be clustered using clustering algorithm 980 (e.g., k-means). Using this approach, metadata dimensions that have clusters with fewer than T embeddings (e.g., where T is a threshold value) may be identified. Depending on whether these clusters represent important structures of conversations, the identified clusters may indicate that more conversational data corresponding to those clusters should be collected, and/or an alert may be generated to indicate that the corresponding types of conversation are underrepresented in conversational data 200/320 (e.g., the dataset). That is, these identified clusters may indicate that conversational data 200/320 does not sufficiently capture real-world conversations. These identified clusters may also indicate data quality issues that may cause bias when training machine learning algorithms using conversational data 200/320. These identified clusters may also indicate emerging behavior(s) of new users previously unconsidered when designing the natural language interface, such as when users ask certain follow-up questions and/or look for information in an unforeseen scenario and/or situation. For example, these identified clusters may indicate the onset of users asking about COVID policies related to travel as the COVID pandemic is just emerging.

Monitoring Conversational Interfaces Over Time

Figure 12:
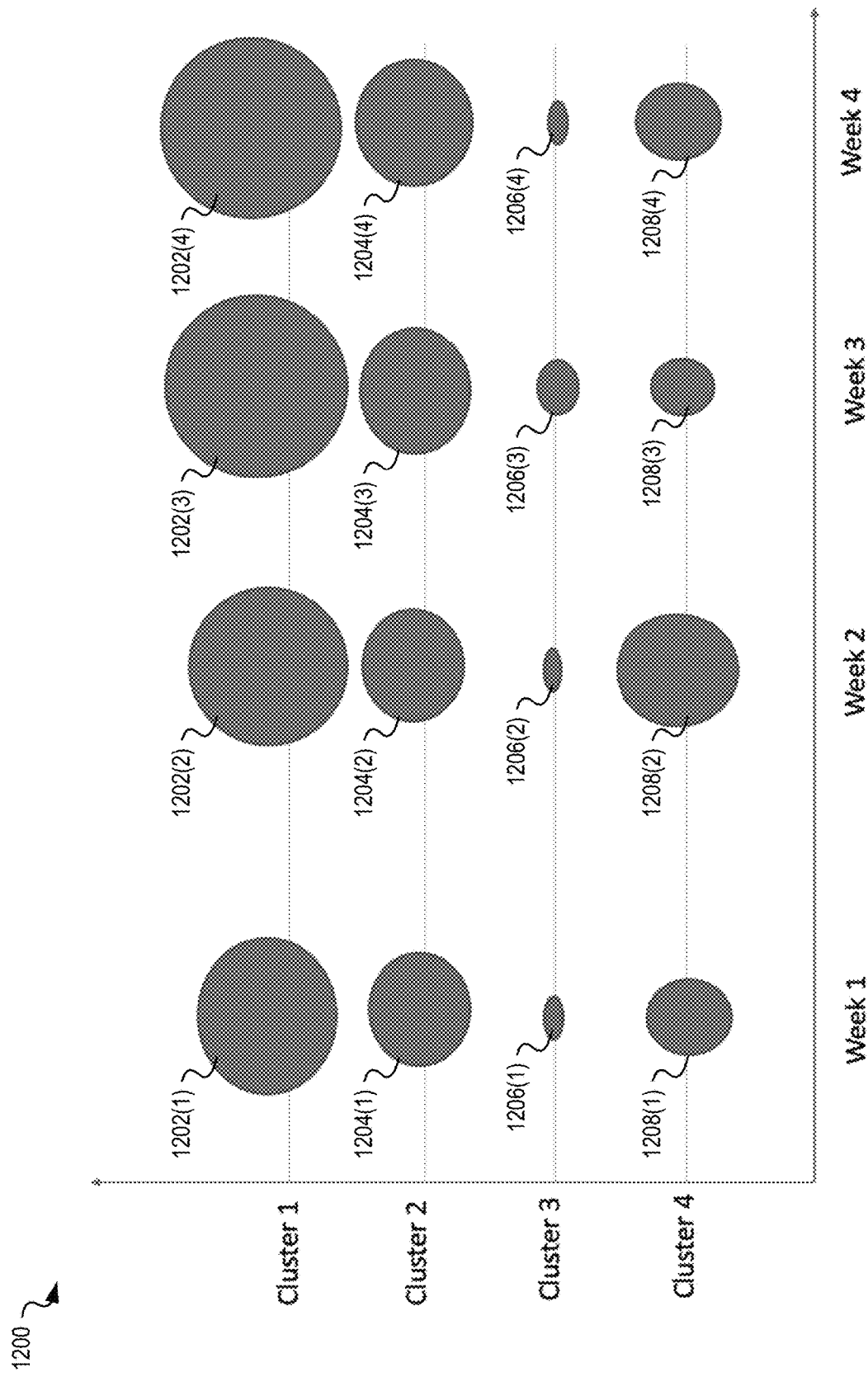
FIG. 12 shows one example cluster graph, generated by the clustering algorithm of FIG. 9, illustrating changes in each of four clusters at intervals over a defined period, in embodiments.

Conversational interfaces may be monitored over time by keeping track of the number of clusters, the number of graph embeddings 344 in each cluster and the sum of distances between graph embeddings 344 in each cluster. FIG. 12 shows one example cluster graph 1200, generated by clustering algorithm 980 of FIG. 9, illustrating changes in each of four clusters (cluster 1, cluster 2, cluster 3, and cluster 4) at intervals (e.g., week 1, week 2, week 3, and week 4). Like numbered circles on each row (e.g., circles 1202, 1204, 1206, and 1208) represent one cluster over time (defined by the X-Axis), where a size of each circle represents a size of the cluster (e.g., a number of graph embeddings in the cluster) at that time. In the example of FIG. 12, circles 1202(1)-(4) show changes in a size of cluster 1 at each of four weekly intervals, circles 1204(1)-(4) indicate a size of cluster 2 at each of the four weekly intervals, circles 1206(1)-(4) indicate a size of cluster 3 at each of the four weekly intervals, and circles 1208(1)-(4) indicate a size of cluster 4 at each of the four weekly intervals. Cluster graph 1200 clearly indicates that cluster 1 and cluster 2 are increasing in size over time, that cluster 3 and cluster 4 are of a less significant size, and that cluster 3 and cluster 4 oscillate in size over the period. The size of the circle diminishing in cluster graph 1200, indicates that the type of conversations represented by that cluster may be less, or no longer, relevant. For example, conversations may become less relevant due to changing business conditions and/or changing environmental conditions, such as the relevance of Flu shot related conversations in the middle of a COVID pandemic.

Accordingly, by generating graph embeddings 344 and using clustering algorithm 980 to generate corresponding cluster data 958, at intervals, it is possible to detect changes within cluster data 958 over time. For example, first clusters data 958 is generated, using conversational analytics toolset 360, for conversational data captured at natural language interface 100 during a first period, and second cluster data 958 is generated for conversational data captured at natural language interface 100 during a second period that may or may not overlap at least part of the first period. Accordingly, by comparing the first cluster data and the second cluster data, changes in the conversations over time may be determined. Detected changes may be due to seasonality or due to unforeseen changes in a business environment in which natural language interface 100 operates. New conversations that correspond to centroids of clusters may emerge over time using the above process. As certain clusters contain more and more embeddings and the distances between points grow, clustering algorithm 980 may be adjusted and re-run. New centroids that emerge may represent new types of conversations. The different summary statistics that describe the clusters form a time series 960. Change detection mechanisms may be applied to time series 960 to detect change in trend. That is, changes to cluster data 958 over time indicates trends in the conversations at natural language interface 100.

FIGS. 13A-13C are graphs representing one example of time series 960 illustrating changes in clustering of graph embeddings 344 and corresponding centroids over time. FIG. 13A is a graph 1300 showing a first cluster 1302 of K graph embeddings 1304 (e.g., graph embeddings 344, also known as embedded conversations) with a centroid 1306 at time T0. Second graph embeddings 1308 are less than k in number, and therefor do not form a cluster.

FIG. 13B is a graph 1330 showing first cluster 1302 unchanged and a new cluster 1332, formed at time T0+t. In one example of operation, at time T0+t, clustering algorithm 980 is invoked to process an adjusted/updated dataset of conversations (e.g., updated graph embeddings 344) either by direct request from the user, or based on a schedule defined by the user. For example, the schedule may define a time interval, such as weekly or monthly and may define a starting date. Accordingly, clustering algorithm 980 runs to include any new conversations that were converted into graph embeddings 344 during this interval and thereby captures dynamics of these constantly varying conversations. Further, any filters applied to the conversations may remain the same or may be changed by the user. For example, where conversations include seasonal characteristics (e.g., power outages of an energy company in summer vs. power outages of the energy company in winter) it is more meaningful to apply a filter such that only conversations corresponding to that season are processed by clustering algorithm 980. The k parameter of k-means or k-medioids algorithms may also change as graph embeddings 344 are updated (see earlier discussion about determining the k parameter) and therefore the number of clusters and/or their centroid may change. This is likely since "typical" conversations for each cluster may change.

FIG. 13C is a graph 1360 showing, for time T0+2t, first cluster 1302 still unchanged but cluster 1332 of FIG. 13B has evolved into cluster 1362, including additional graph embeddings 1310 that cause its centroid 1366 to change location. Accordingly, at time T0+2t, cluster 1362 has grown in size, its centroid 1366 has moved, and it appears to be more dominant than first cluster 1302. Similarly, cluster graph 1200, FIG. 12, may also be regenerated to visualize these changes.

Conversational analysis toolset 360 allows a user to (1) track evolution of conversational flow structure over time across different criteria/data dimensions (including but not limited to conversations start time, end time, duration, available user information such as location, number of interactions of interface per user, user age and gender, etc.), and (2) detect bias in conversational flows. A biased dataset includes data with non-proportional distribution of attributes. For example, conversational analysis toolset 360 allows the user to find conversational flows where the conversation over-represents/under-represents a person. Conversational analysis toolset 360 allows the user to view a distribution of different attributes of conversations in each cluster.

Figures 14A, 14B:
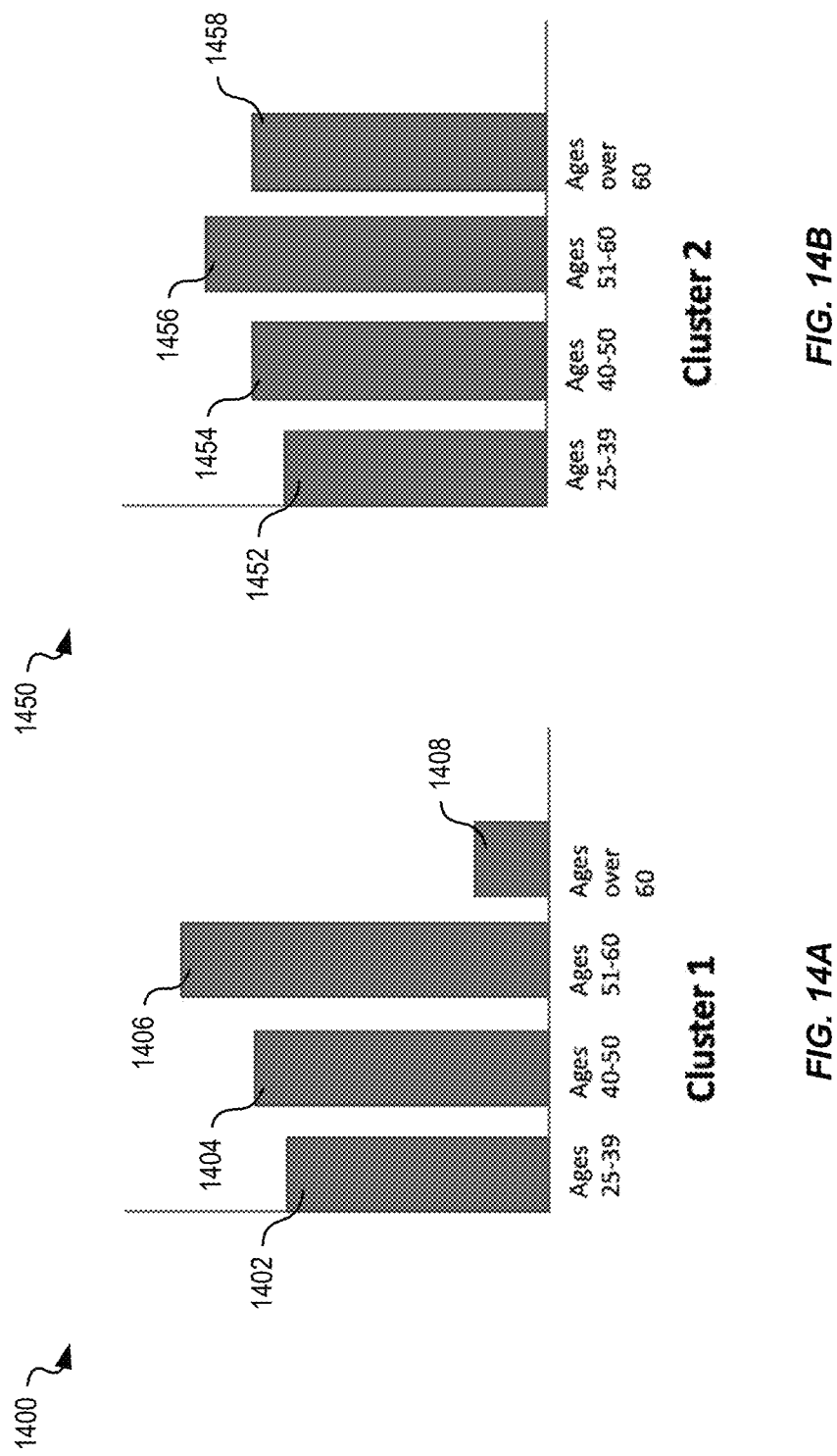
FIGS. 14A and 14B are graphs showing example histograms for age ranges in a first cluster and second cluster, respectively, generated by the conversational analytics toolset of FIG. 3, in embodiments.

FIG. 14A is a graph showing one example histogram 1400 for age ranges in a first cluster (e.g., first cluster 1302, FIGS. 13A-C) as generated by conversational analytics toolset 360. FIG. 14B is a graph showing one example histogram 1450 for age ranges in a second cluster (e.g., cluster 1362) as generated by conversational analytics toolset 360. In these examples, a first columns 1402/1452 represents an age range between 25 and 39 years, second columns 1404/1454 represent an age range between 40 and 50 years, a third column 1406/1456 represents an age range between 51 and 60 years, and column 1408/1458 represents an age range of 60 years and above. Different age ranges and/or other attributes may be selected without departing from the scope hereof.

Histograms 1400 and 1450 present age ranges for persons having the conversations included in the respective clusters, however, other usable attributes include state and/or country information, gender, and so on. By displaying histograms 1400 and 1450, conversational analysis toolset 360 allows the user to discern bias in the conversations based on the sizes of clusters, which would indicate a skew in certain types of conversations. This bias information allows a practitioner developing a natural language interface (e.g., for a company) to refine their natural language interfaces. For example, a large number of conversations mapping into the same cluster may indicate that the number of intents should be increased to address conversations (sub types/more specific types of conversations) that have emerged. Conversely, where conversational analysis toolset 360 indicates that a smaller number of conversations are occurring, either seasonally or permanently, for a particular cluster, the user may infer users are no longer interacting with the interface because they are no longer interested in a certain service provided by the company offering the interface) and therefore corresponding intents may be removed. Indicated bias may also help identify when a certain group of users are not using the interface because they no longer use the service offered by the company as much, and therefore the user may address this issue in other ways, for example refining one or more of the company's services, marketing/reach strategy, and so on.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for ensuring k-anonymity in shared conversation datasets, comprising:
generating graph embeddings for each of a plurality of conversations from conversational data for N different users;
determining at least one cluster of the graph embeddings using a clustering algorithm;
determining number K of points in the at least one cluster;
sharing at least part of the conversational data corresponding to the at least one cluster when K is greater than or equal to N;
extracting at least one representative conversation corresponding to at least one graph embedding within the at least one cluster to form the at least part of the conversational data;
storing the at least one representative conversation in a cache for fast access; and
storing the conversational data in secondary storage having slower access than the cache.

2. The method of claim 1, the at least one graph embedding corresponding to a centroid of the at least one cluster.

3. The method of claim 1, the clustering algorithm implementing one or both of k-means and k-medioids.

4. A method for ensuring k-anonymity in shared conversation datasets, comprising:
generating graph embeddings for each of a plurality of conversations from conversational data for N different users;
determining at least one cluster of the graph embeddings using a clustering algorithm;
determining number K of points in the at least one cluster;
sharing at least part of the conversational data corresponding to the at least one cluster when K is greater than or equal to N;
determining results by filtering the conversational data based on at least one of a metadata dimension and an outcome variable; and
processing the results to generate filtered graph embeddings related to each of the at least one of a metadata dimension and an outcome variable.

5. The method of claim 4, further comprising:
clustering the filtered graph embeddings using the clustering algorithm;
identifying clusters having fewer than a threshold value T of graph embeddings; and
indicating that the identified clusters require collection of more conversational data corresponding to the at least one of the metadata dimension and/or the outcome variable.

6. The method of claim 5, further comprising generating an alert to indicate that the corresponding types of conversation are under-represented in conversational data.

7. The method of claim 1, further comprising displaying, for each cluster, a histogram indicative of at least one attribute of the cluster.

8. The method of claim 7, the attribute being age of a person having the conversation.

9. A method for efficient searching of conversations, comprising:
generating graph embeddings for each of a plurality of conversations from conversational data for different users;
determining at least one cluster of the graph embeddings using a clustering algorithm;
determining a representative conversation of the at least one cluster, wherein the representative conversation removes repetitive information;
storing the representative conversation in a cache; and
searching the cache to find the representative conversation based on input parameters.

10. A method for efficient searching of conversations, comprising:
generating graph embeddings for each of a plurality of conversations from conversational data for different users;
determining at least one cluster of the graph embeddings using a clustering algorithm;
determining a representative conversation of the at least one cluster;
storing the representative conversation in a cache; and
searching the cache to find the representative conversation based on input parameters and to allow representative searches to be performed rapidly.

\* \* \* \* \*